US009459426B2

(12) United States Patent
Leigh et al.

(10) Patent No.: US 9,459,426 B2
(45) Date of Patent: Oct. 4, 2016

(54) OPTICAL PLENUM

(75) Inventors: Kevin B Leigh, Houston, TX (US);
George D Megason, Spring, TX (US);
David W Sherrod, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 14/368,933

(22) PCT Filed: Apr. 11, 2012

(86) PCT No.: PCT/US2012/033011
§ 371 (c)(1),
(2), (4) Date: Jun. 26, 2014

(87) PCT Pub. No.: WO2013/154548
PCT Pub. Date: Nov. 7, 2013

(65) Prior Publication Data
US 2014/0369653 A1 Dec. 18, 2014

(51) Int. Cl.
G02B 6/46 (2006.01)
G02B 6/44 (2006.01)
G02B 6/36 (2006.01)
G06F 1/18 (2006.01)

(52) U.S. Cl.
CPC ............. G02B 6/4459 (2013.01); G02B 6/36 (2013.01); G02B 6/4452 (2013.01); G02B 6/46 (2013.01); *G06F 1/183* (2013.01)

(58) Field of Classification Search
CPC .................. G02B 6/4452; G02B 6/4459
See application file for complete search history.

(56) References Cited

U.S. PATENT DOCUMENTS

| | | | | |
|---|---|---|---|---|
| 5,142,606 A | * | 8/1992 | Carney | G02B 6/4452 385/134 |
| 5,640,481 A | * | 6/1997 | Llewellyn | G02B 6/4452 385/134 |
| 6,493,498 B1 | | 12/2002 | Colombo et al. | |
| 6,806,998 B2 | | 10/2004 | Gage et al. | |
| 7,452,236 B2 | | 11/2008 | Verdiell et al. | |
| 7,848,608 B2 | * | 12/2010 | Owens | G02B 6/4452 385/134 |
| 7,974,105 B2 | | 7/2011 | Dean, Jr. et al. | |
| 2004/0264112 A1 | | 12/2004 | Koehler et al. | |
| 2009/0148116 A1 | | 6/2009 | Yanagimachi et al. | |
| 2011/0116755 A1 | | 5/2011 | Rolston | |

FOREIGN PATENT DOCUMENTS

| | | |
|---|---|---|
| JP | 2001311836 | 11/2001 |
| JP | 2004347967 | 12/2004 |

OTHER PUBLICATIONS

International Searching Authority, The International Search Report and the Written Opinion, Dec. 21, 2012, 8 Pages.

* cited by examiner

*Primary Examiner* — Daniel Petkovsek
(74) *Attorney, Agent, or Firm* — Hewlett Packard Enterprise Patent Department

(57) ABSTRACT

In the present idsclosure inter-rack optical plenum may be used to route optical fibers between multiple racks of a system. An intra-rack optical plenum may be coupled to one of the racks and the inter-rack optical plenum. The intra-rack optical plenum may route an optical fiber between a first connector configured to mate with a first device and a second connector conifugred to mate with the inter-rack optical plenum.

15 Claims, 8 Drawing Sheets

OPTICAL PLENUM

BACKGROUND

A system can include multiple electronic devices. The multiple electronic devices may communicate via various cables that are routed between the devices. The multiple electronic devices may be disposed in multiple racks. Consequently, communication may be enabled between electronic devices disposed within the same rack (intra-rack communication) and electronic devices disposed within different racks (inter-rack communication).

BRIEF DESCRIPTION OF THE DRAWINGS

Some embodiments are described with respect to the following figures.

DETAILED DESCRIPTION

Figure 1:
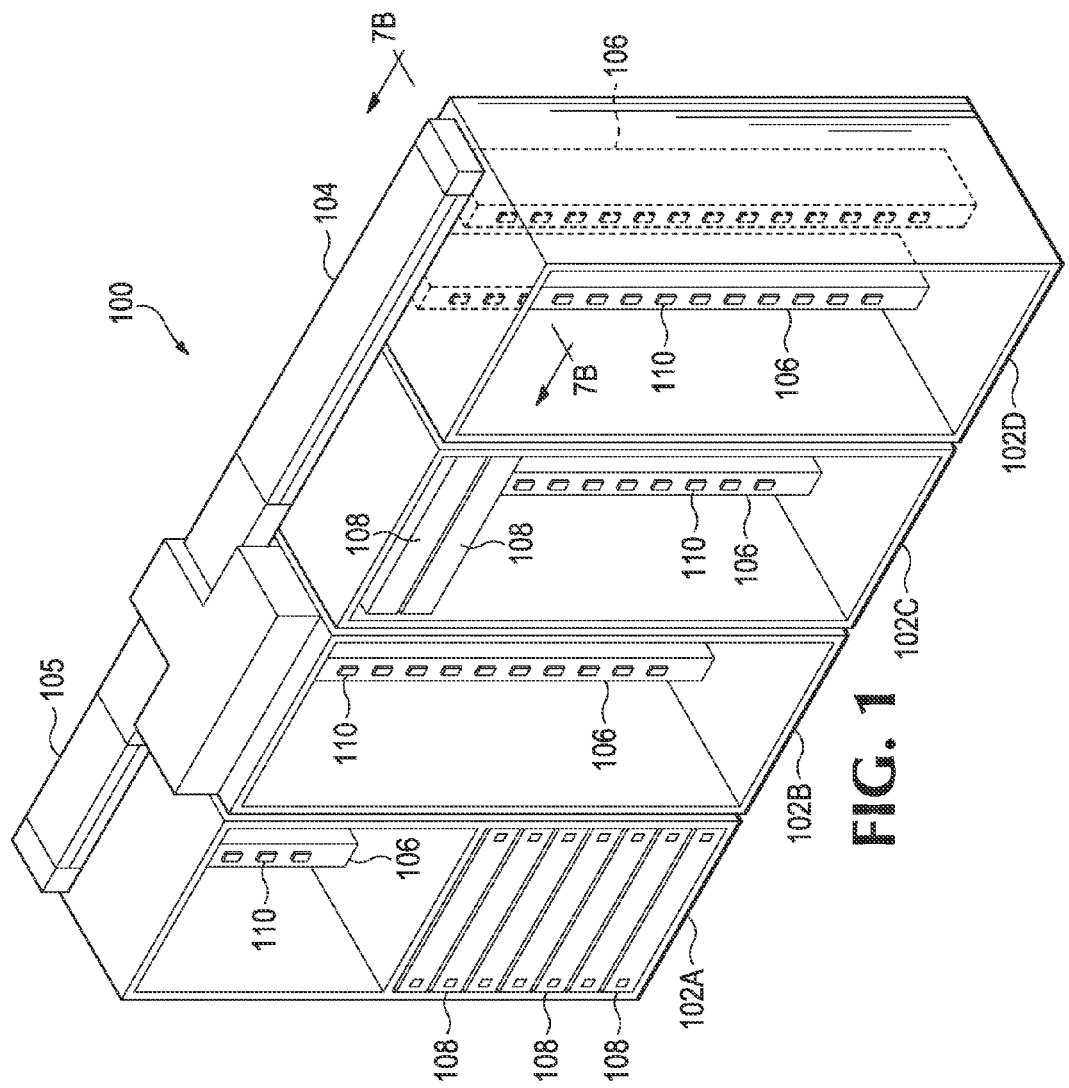
FIG. 1 illustrates a front perspective view of a system in accordance with an example of the present disclosure.

Electronic devices, such as processing devices, storage devices, communications devices, management devices, and so forth, can be mounted in a rack, which includes a frame and other support elements for holding the electronic devices. The rack provides receptacles into which the electronic devices can be inserted. The rack can also include a backplane infrastructure for connection to the electronic devices that have been inserted into the rack. The connectors of the backplane infrastructure are connected to communications media (e.g. optical fibers, electrical wires, etc.) to allow for communication among the electronic devices.

The communication media can include optical communication media (optical fibers, optical power splitters, optical power combiners) for routing communication between various electronic devices. It is noted that the electronic devices and the communication media can also include electrical wires for electrically connecting the electronic devices to various other electronic devices. In the ensuing discussion, reference is made to just optical communication media—note, however, that various components discussed below can also include or be utilized in conjunction with various other types of communication media such as, but not limited to, electrical communication media (e.g. wire).

As mentioned, backplane infrastructures may be used to route various communication media. In addition, optical fibers may be used for separable optical connectivity such as cables external to electronic devices. The optical fibers may be coupled to a face-plate bulkhead of the processing devices, storage devices, communications devices, or management devices. These external cables may be routed from rack to rack via raised floor plenums below the racks or suspended cable trays above the racks. A plenum as used herein is a member configured to route one or more cables from a first location to a second location. As a consequence of routing, the optical cables are enclosed in sheathing jackets that provide abrasion resistance and structural strength. This construction makes the cable bundles large and expensive. Additionally, these external cables are exposed and available for an operator to mistakenly remove or damage the optical cables, thereby increasing the risk the system errors. The optical cables, of which many are present, are installed and serviced manually, thereby increasing cost and further increasing a likelihood of system connectivity errors.

In accordance with some implementations, inter-rack optical plenums and intra-rack optical plenums are disclosed. An inter-rack optical plenum is a plenum that routes one or more fiber optic cables between a first rack and a second rack. An intra-rack optical plenum is a plenum that routes one or more fiber optic cables between various locations within a single rack. It is noted that while the optical plenums route optical fibers, they may also route other types of communication media in conjunction with the optical fibers. Inter-rack optical plenums and intra-rack optical plenums, as will be discussed herein, may be configured to receive optical cable bundles and/or trays of optical fibers. A tray of optical fibers is a component with optical fibers pre-installed between various connectors. The optical tray may be received within the plenums to enable modular deployment of optical fibers.

The inter-rack and intra-rack optical plenums may be integrated within a rack or alternatively, modularly coupled to the rack. The optical plenums provide a protected environment for optical media and may include optical connectors disposed at various locations thereby enabling electronic devices to blind mate with the optical fibers routed through the plenums. Because of the protected nature of the inter-rack and intra-rack optical plenums, optical fibers may utilize less protective sheathings thereby enabling denser and lower cost optical fibers, better use of space, and improved airflow. In addition, an integrated plenum system manages optical fibers within its encasement reducing failures due to environment and handling. Furthermore, an optical tray enables flexible deployment and servicing of the optical media of different types including optical fibers, optical power splitter and optical power combiner components.

FIG. 1 illustrates a front perspective view of a system in accordance with an example of the present disclosure. The system 100 comprises four (4) racks 102A-D, which include various numbers of electronic devices 108. The electronic devices 108 may include, processing devices, storage devices, communications devices, and management devices, among others. More or fewer devices may be incorporated without deviating from the scope of the disclosure. In addition, the system 100 includes an inter-rack optical plenum 104 and an intra-rack optical plenum 106. The inter-rack optical plenum 104 and the intra-rack optical plenums 106 enable routing of optical fibers and communication between various electronic devices 108.

Inter-rack optical plenum 104 is configured to route one or more optical fibers from a first rack to a second rack. For example, inter-rack optical plenum 104 may route optical fibers between rack 102A and any and all of racks 102B-D. The inter-rack optical plenum 104 may be disposed in various locations with respect to the racks 102A-D, for example, on top of the racks 102A-D, behind the racks 102A-D, in the middle of racks 102A-D, or underneath the racks 102A-D. The inter-rack optical plenum 104 may route various other types of communication media in addition to or in lieu of optical fibers.

Figure 2:
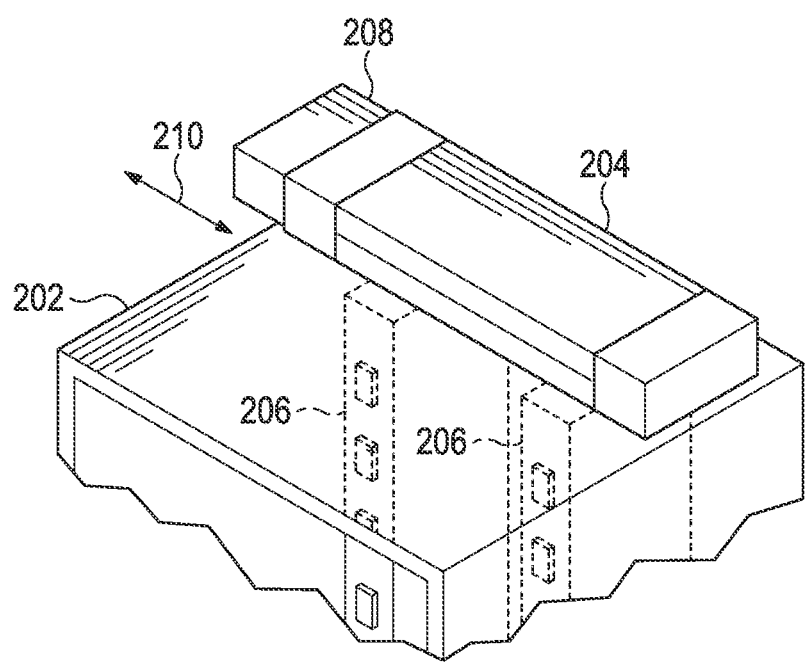
FIG. 2 illustrates perspective view of an inter-rack optical plenum in accordance with an example of the present disclosure.
Figure 5:
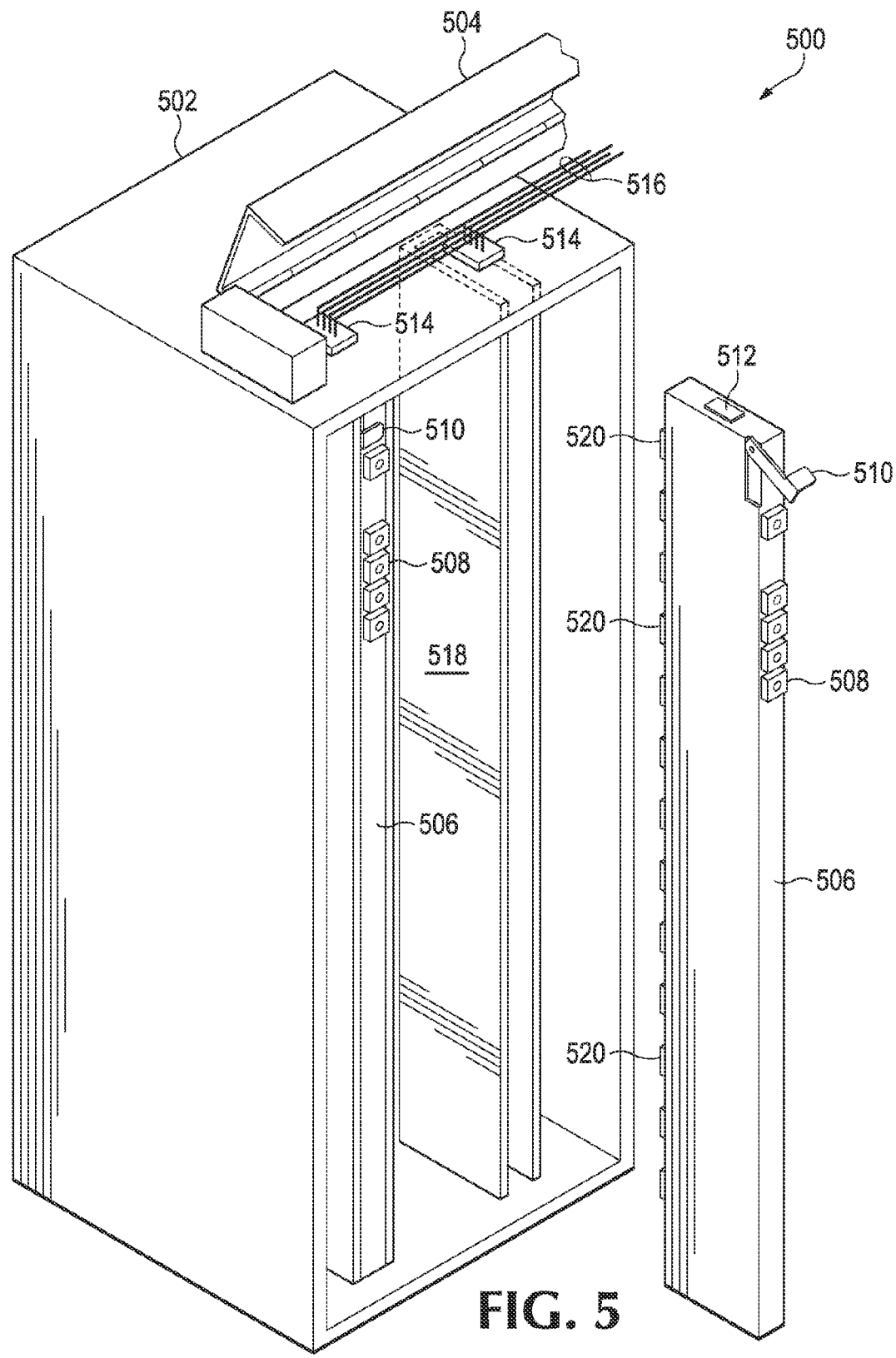
FIG. 5 is a rear perspective view of an intra-rack plenum and an inter-rack plenum in an un-mated condition in accordance with an example of the present disclosure.

Referring to FIG. 2, one example of an inter-rack optical plenum is illustrated. The inter-rack optical plenum 204 may be manufactured as a part of the rack 202. In these examples, each rack has a segment of the inter-rack optical plenum and the inter-rack optical plenum segments are bridged by using an extensible plenum bridge 208. The extensible plenum bridge 208 may extend and retract as indicated by arrow 210 to account for any gaps between adjacent racks or inter-rack optical plenums. As illustrated, rack 202 is manufactured with an inter-rack optical plenum 204 which is configured to mate with other integral or modular inter-rack optical plenums to form the inter-rack optical plenum, such as the inter-rack optical plenum 104 of FIG. 1. While illustrated in a closed position, the inter-rack optical plenum 204 includes a hinged cover to enable access, as illustrated in FIG. 5. The inter-rack optical plenum 104 provides protection to various fiber optics routed within the inter-rack optical plenum 208.

Referring back to FIG. 1, the inter-rack optical plenum 104 may be manufactured to a predetermined fixed length and attached above the racks to span the various racks 102A-D. Shorter or longer inter-rack optical plenums 104 may be utilized in conjunction with systems incorporating more or fewer racks. The inter-rack optical plenums 104 may include a plurality of connectors (not illustrated) configured to couple to the intra-rack optical plenums 106. In the illustrated example, the connectors are disposed on a bottom side of the inter-rack optical plenum 104. The inter-rack optical plenum 104 may also include fiber optic cable management features, such as mechanical retention, optical fiber spool, etc.

The inter-rack optical plenum 104 is configured to receive and route optical fibers in multiple manners. In a first example, the inter-rack optical plenum 104 may be configured to receive a bundle of optical fibers. A bundle of optical fibers comprises a plurality of loosely bound together optical fibers. In another example, the inter-rack optical plenum 104 is configured to receive an optical tray comprising the optical fibers. An optical tray as used herein is a manufactured component having optical fibers installed therein.

The intra-rack optical plenum 106 is coupled to a rack 102A-D. The intra-rack optical plenum 106 may route one or more optical fibers from a device connector, such as device connector 110, to the inter-rack optical plenum 104 and the optical fibers routed therein. Similar to the inter-rack optical plenum 104, the intra-rack optical plenum 106 may also be configured to receive optical fibers in multiple manners. In a first example, the intra-rack optical plenum 106 is configured to receive an optical tray comprising the optical fibers. In another example, the intra-rack optical plenum 106 may be configured to receive a bundle of optical fibers. The optical fibers may be stored within the intra-rack optical plenum 106 to provide a known location of the bundle and further enable ease of access for installation and/or servicing. It is noted that the inter-rack optical plenum 104 and the intra-rack optical plenum 106 may comprise various combinations of optical fiber bundles and optical trays. For example, the inter-rack optical plenum 104 may comprise an optical tray while the intra-rack optical plenum 106 may comprise a bundle of optical fibers. Other combinations are contemplated.

Similar to the inter-rack optical plenum 104, intra-rack optical plenums 106 may have varying lengths. For example, as illustrated in FIG. 1, the intra-rack optical plenums 106 in rack 102A are shorter than the intra-rack optical plenums 106 in rack 102D. The varying lengths of intra-rack optical plenums 106 may enable use of other rack mount modules than those configured for use with racks as disclosed herein.

Figure 3:
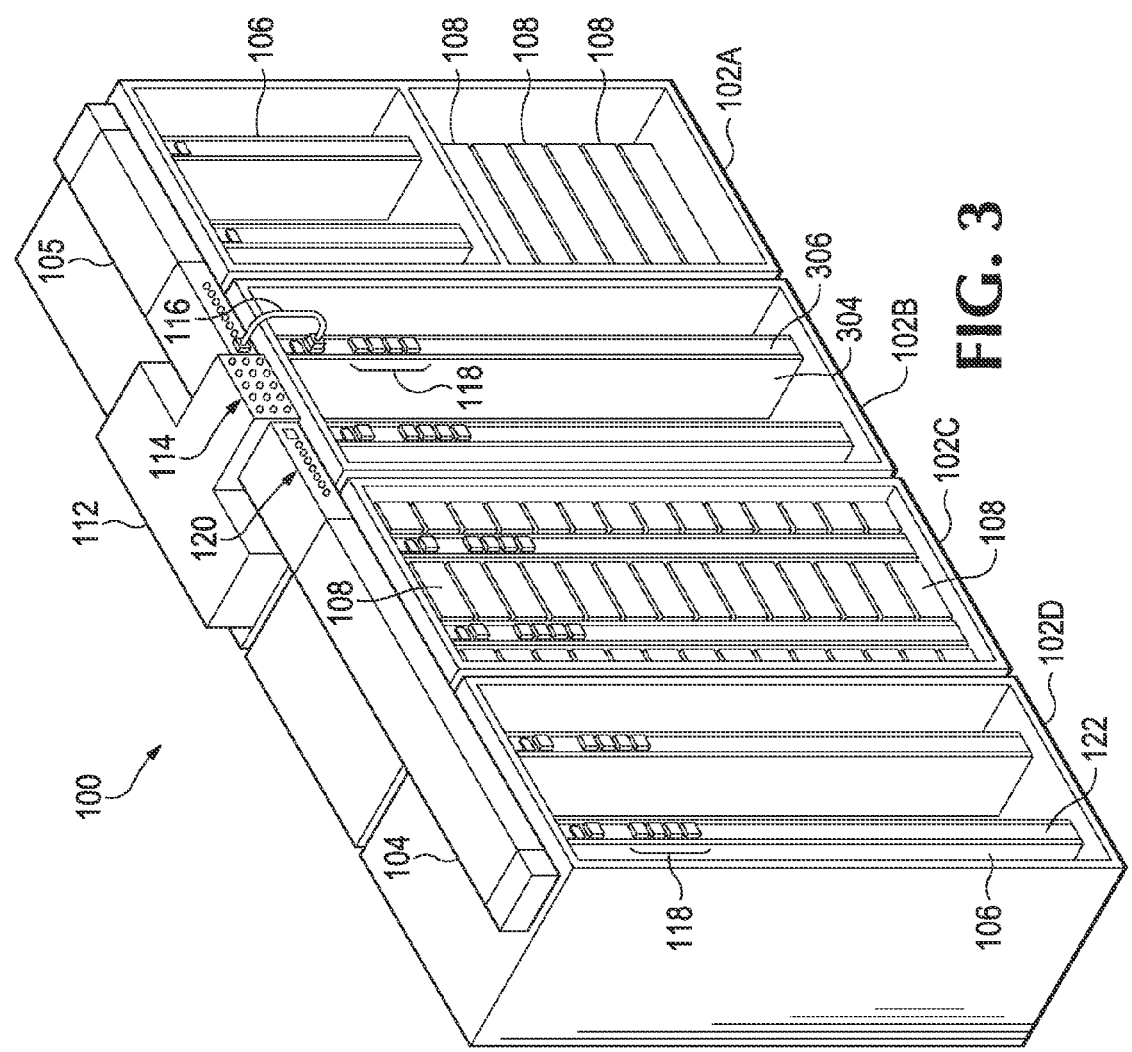
FIG. 3 illustrates a rear perspective view of a system in accordance with an example of the present disclosure.

FIG. 3 illustrates a rear perspective view of the system 100 in accordance with an example of the present disclosure. The system 100 includes a junction box 112 having a plurality of indicators 114. In addition, the inter-rack optical plenum 104 and the intra-rack optical plenums 106 include indicators 120 and external connectors 118 configured for use with external cables 116.

Figure 4:
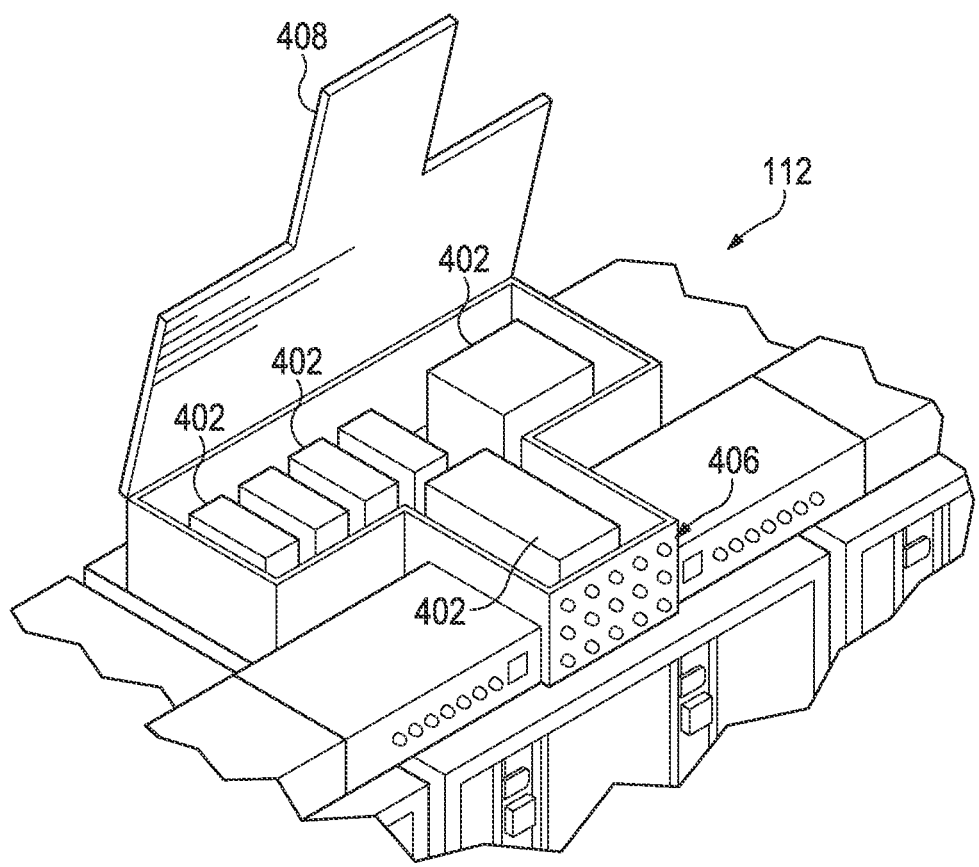
FIG. 4 illustrates a perspective view of a junction box in accordance with an example of the present disclosure.

A junction box 112, as used herein, is a compartment to hold communication media management devices, such as fiber optic cable spools, and/or electronic devices configured to receive the various communications routed via the communications media of the inter-rack optical plenums 104 and the intra-rack optical plenums 106. Referring to FIG. 4, an example of a junction box 112 is illustrated in more detail. The junction box 112 may include a hinged surface to enable access to internal components 402. Each component (all labeled generically as 402) in the junction box 112 may be modularly installable and serviceable. A component 402 in the junction box 112 may include active and/or passive optical connectivity components such as optical power splitters and optical power combiners. In addition, the junction box may include a plurality of indicators 406, such as but not limited to, light emitting diodes (LEDs), displays, or other devices to indicate the various states of the components and/or optical media therein. Various other devices, for example, buttons and switches may be utilized.

Referring back to FIG. 3, the inter-rack optical plenum 104 and the intra-rack optical plenum 106 may also include various indicators 120 which may be used to convey various information pertaining to the state of the plenum, the communication media, and/or the devices coupled to the optical fibers within the various plenums 104, 106. While the inter-rack optical plenum 104 and the intra-rack optical plenums 106 may be configured to blind mate with various electronic devices 108, they may also be configured for use with external cabling.

In one example, illustrated within FIG. 3, an external cable 116 is utilized to couple optical fibers routed via an optical tray within an intra-rack optical planum 106 to optical fibers routed within the inter-rack optical plenum 104. More specifically, rack 102B includes an optical tray 306 disposed within intra-rack optical plenum 304. The optical tray 306 includes a plurality of external connectors 118. The external optical connecters 118 may enable external cables 116 to be incorporated into the plenum infrastructure. The use of external cables, in various examples, may expand the flexibility associated with the plenum infrastructure. For example, in various examples, an external testing device may be coupled to the system. Additionally, the external cables 116 may be utilized to couple the optical fibers of the intra-rack optical plenum 304 to the inter-rack optical plenum 104.

As illustrated in FIG. 1 and FIG. 3 a first rack 102A includes a plurality of electronic devices 108. The plurality of electronic devices 108 of the first rack 102A are blind-mated to connectors associated with the first intra-rack optical plenum 106 and an associated optical tray that is disposed therein. A second rack 102C includes a plurality of electronic devices 108 that are blind-mated to connectors associated an intra-rack optical plenum 106 and an associated optical tray that is disposed therein. An inter-rack optical plenum 104 is coupled to the first rack 102A and the second rack 102C. The inter-rack optical plenum 104 includes a plurality of optical connectors (not illustrated) to communicatively couple the optical fibers of the first intra-rack optical plenum 106 in rack 102A to the optical fibers of the second intra-rack optical plenum 106 in rack 102C.

As illustrated, the first intra-rack optical plenum 106 incorporated into the first rack 102A has a first length while the second intra-rack optical plenum 106 incorporated into the second rack 102C has a second length that is different than the first length. As mentioned previously, the varying lengths enable the incorporation of varying electronic devices into the rack systems.

FIG. 5 illustrates a rear perspective view of an intra-rack plenum 518, an optical tray 506, and an inter-rack plenum 504 in an un-mated condition in rack 502 in accordance will an example of the present disclosure. The system 500 may be communicatively coupled to one or more other racks to form a server system. The inter-rack optical plenum 504 and intra-rack optical plenum 518 enable the deployment of rack-level and row-level pre-installed optical fibers.

As illustrated, rack 502 incorporates an inter-rack optical plenum 504 which is configured to couple to one or more other racks (not illustrated). The inter-rack optical plenum 504 incorporates optical fibers 516 and optical connectors 514 that are disposed directly within the inter-rack optical plenum 504. Additionally, intra-rack optical plenum 518 is configured to receive optical tray 506. As illustrated, inter-rack optical plenum 504 incorporating bundled optical fibers may be communicatively coupled to intra-rack optical plenum 518 incorporating one or more optical trays 506.

The inter-rack optical plenum 504, illustrated with a hinged optical plenum cover, houses optical fibers 516 and their respective connectors 514. The inter-rack optical plenum 504 is disposed on top of rack 502. As stated previously, the inter-rack optical plenum 504 may be disposed on various other sides of rack 502. The optical connectors 514 are disposed at predefined locations along the rack 502 such that an intra-rack optical tray 506 disposed within the intra-rack optical plenum 518 may mate with the connector 514. The intra-rack optical plenum 518 may be disposed within rack 502 such that an optical tray, when inserted and secured, properly connects to the optical fibers of the optical tray 506 with the optical fibers 516 of the inter-rack optical plenum 504.

Intra-rack optical plenum 518 and tray 506 are illustrated to a non-coupled state. Tray 506 includes external connections 508, a coupling mechanism 510 and an inter-rack optical plenum connector 512. As illustrated, tray 506 is removed from intra-rack optical plenum 518 and rack 502. To couple the tray 506 within the intra-rack optical plenum 518 and the rack 502, the tray 506 is inserted into intra-rack optical plenum 518 which positions the tray 506 such that connector 512 is aligned with the connector 514 of the inter-rack optical plenum 504. In embodiments in which an optical tray is not inserted into the intra-rack optical plenum 518, for example when bundled cables are utilized, connectors 512, 508, and/or 520 may be disposed on the intra-rack optical plenum 518. Additionally, in various other embodiments, multiple connectors 512 may be disposed on the intra-rack optical plenum 518 or tray 506, and configured to mate with multiple connectors 514 on the inter-rack optical plenum 504 or tray (not illustrated) associated with the inter-rack optical plenum 504.

Coupling mechanism 510 of tray 506 is configured to actuate the connector 512 to move from a first position to a second position. The first position may be associated with the removal of the tray 506 from both the intra-rack optical plenum 518 and the rack 502. The second position may be associated with an engaged position of the tray 506 with the intra-rack optical plenum 518, the rack 502, and the connector 514 associated with the inter-rack optical plenum 504. As coupling mechanism 510, for example a lever, may be configured to extend the connector 512 from the first position to the second position. As stated previously, more than one connector 512 may be utilized in this manner.

Figure 6:
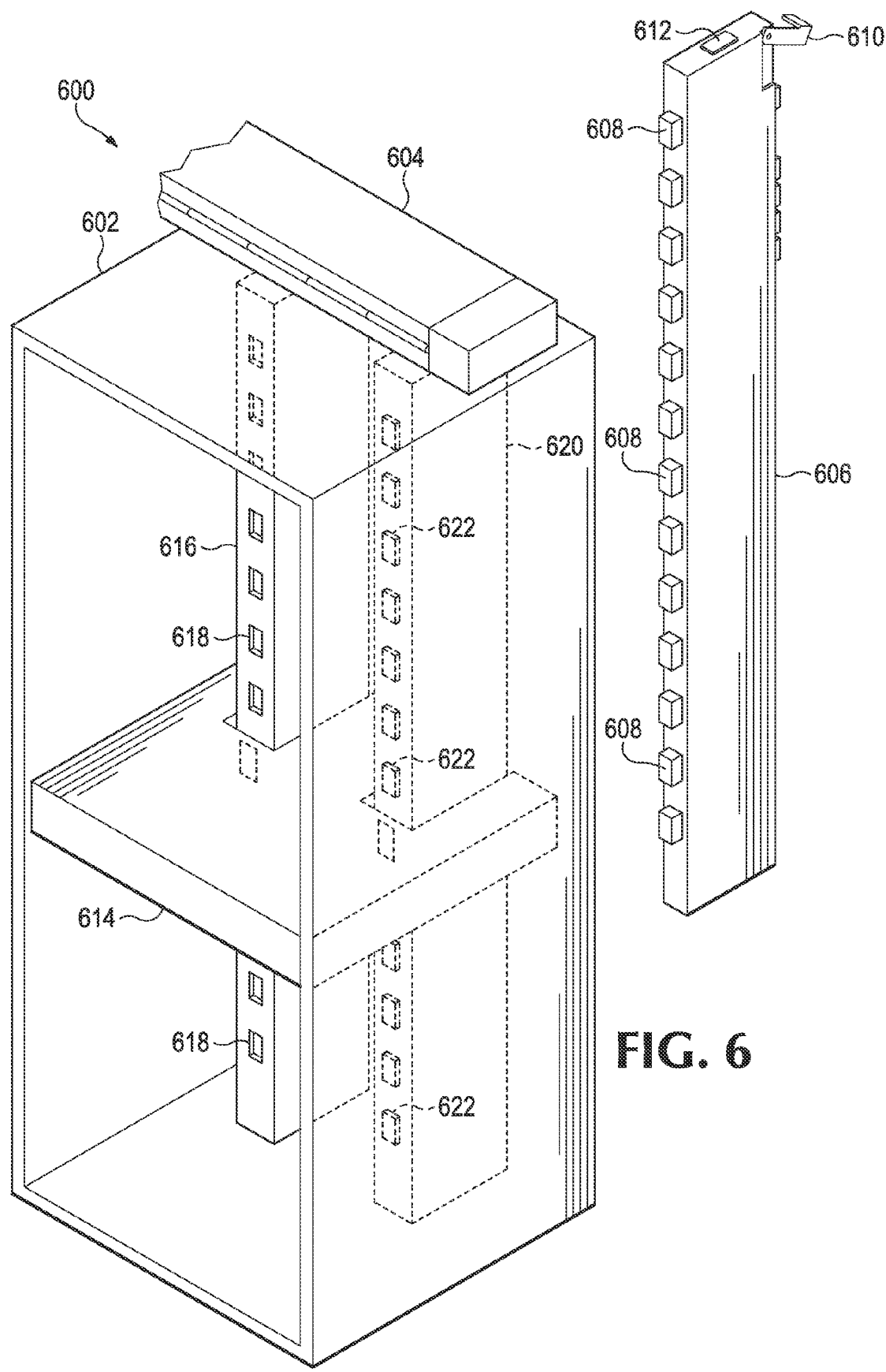
FIG. 6 is a front perspective view of multiple intra-rack plenums and an inter-rack plenum in mated and unmated conditions in accordance with an example of the present disclosure.

FIG. 6 illustrates a front perspective view of two intra-rack optical plenums 616, 620, an optical tray 606, and an inter-rack optical plenum 604 in a mated and unmated condition with the intra-rack optical plenums 616, 620. While illustrated with two intra-rack optical plenums 616, 620, more or fewer intra-rack optical plenums may be utilized.

The intra-rack optical plenum 616 is configured to receive tray 606 which includes blind mate connectors 608. The blind mate connectors 608 are configured to extend through cavities 618 of the intra-rack optical plenum 616 and mate with corresponding blind-mate connectors on an electronic device 614. The tray 606 includes connectors 612 which is configured to mate with a connector disposed within the inter-rack optical plenum 604. Tray 606 further includes a lever 610 which when actuated, extends the inter-rack optical plenum connector 612 between an extended position and a retracted position. In the extended position, the tray 606 is secured within the intra-rack optical plenum 616 and the rack 602.

The intra-rack optical plenum 620 is illustrated having an optical tray (not shown) disposed therein. The tray includes connectors 622 which extend through cavities disposed on the intra-rack optical plenum 620 to mate with electronic devices, such as electronic device 614. While not illustrated, the tray may include a lever which has been actuated to secure the tray within the intra-rack optical plenum 620.

Electronic devices 614, as previously discussed may include processing devices, storage devices, communications devices, and management devices, among others. The electronic devices 614 may include a variety of form factors such that they are configured to mate with the intra-rack optical plenums 616, 620, and occupy any area between the various intra-rack optical plenums 616, 620. Other form factors are contemplated.

Figures 7A, 7B:
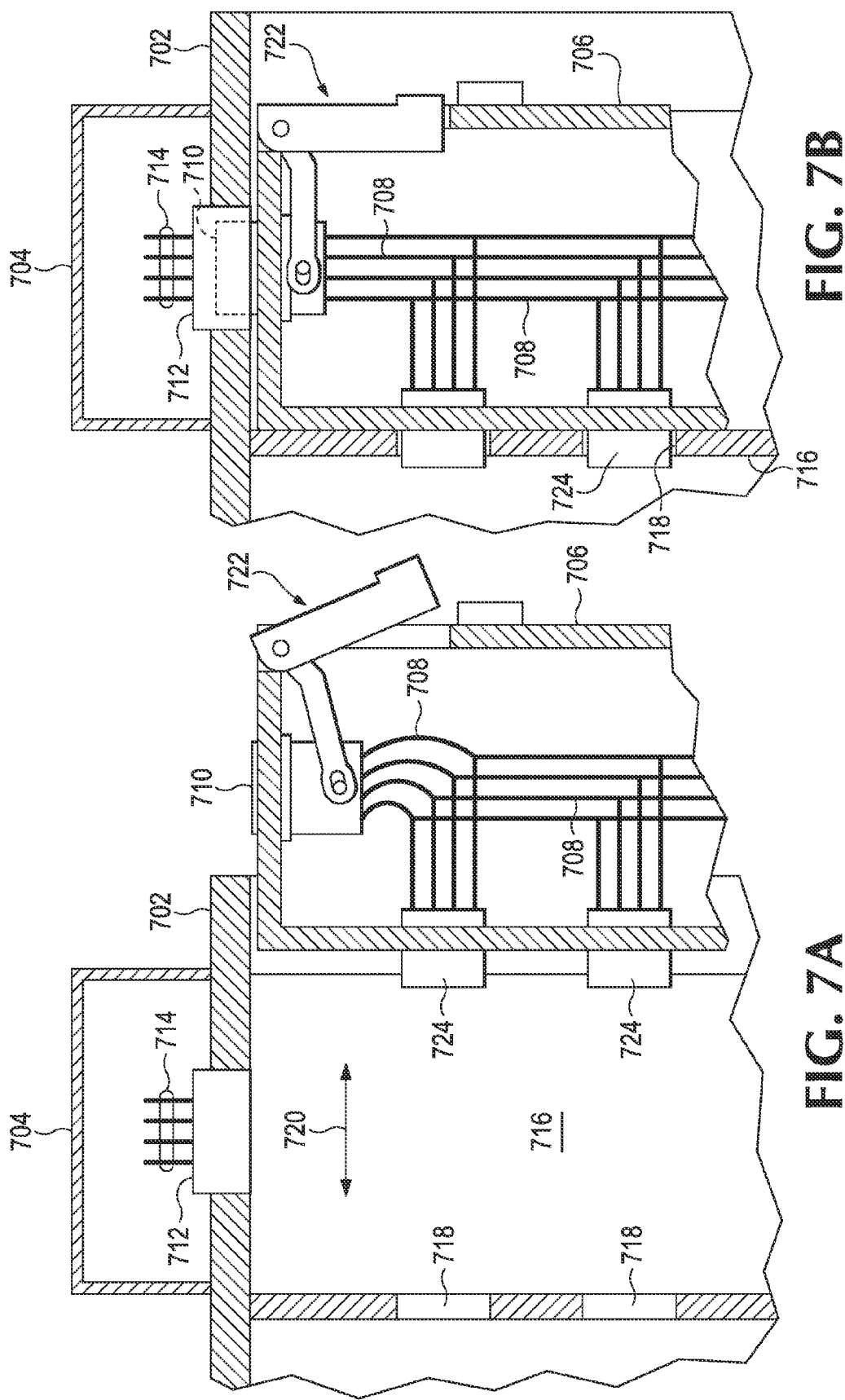
FIGS. 7A-B illustrate a side profile view of an intra-rack plenum and an inter-rack plenum in an un-mated condition and a mated condition, respectively, in accordance with an example of the present disclosure.

FIGS. 7A-B illustrate a side profile view of an intra-rack plenum 716 and an inter-rack plenum 704 in an un-mated condition and a mated condition, respectively, in accordance with an example of the present disclosure. In the un-mated condition of FIG. 7A, the latching mechanism 722 of an optical tray 706 to be received by the intra-rack optical plenum 716 is in a released state. In the released state, the latching mechanism 722 may move the inter-rack optical plenum connector 710 into a retracted position such that the tray 706 may be inserted or removed from the rack 702 and the intra-rack optical plenum 716 as indicated by arrow 720.

Once inserted into the rack 702 and the intra-rack optical plenum 716, the latching mechanism 722 may be actuated. Actuation of the latching mechanism 722 may extend the inter-rack optical plenum connector 710 such that it mates with a correspondingly disposed connector 712 within the inter-rack optical plenum 704. To account for the extension and retraction of the connector 710 within the tray 706, the optical fibers 708 of the tray 706 may be a predetermined length such that they extend and compress with the corresponding extension and retraction of the connector 710.

Referring to FIG. 7B, the tray 706 is illustrated as being secured within the intra-rack optical plenum 716. The connectors 724 extend through correspondingly disposed cavities within the intra-rack optical plenum 716 to mate with one or more electronic devices. The latching mechanism 722 has been actuated and consequently, inter-rack optical plenum connector 710 is extended to mate with the connector 712 of the inter-rack optical plenum 704. In this manner a device coupled to connector 724 may transmit data via optical fibers 708 routed via intra-rack optical plenum 716 to optical fibers 714 routed via inter-rack optical plenum 704 to various other electronic devices (not illustrated). In various other examples, the latching mechanism 722 may include other components, for example magnets. Magnets may be utilized in conjunction with the latching mechanism 722 to bring the inter-rack optical plenum connector 710 of tray 706 into a mated condition with the connector 712.

Figure 8:
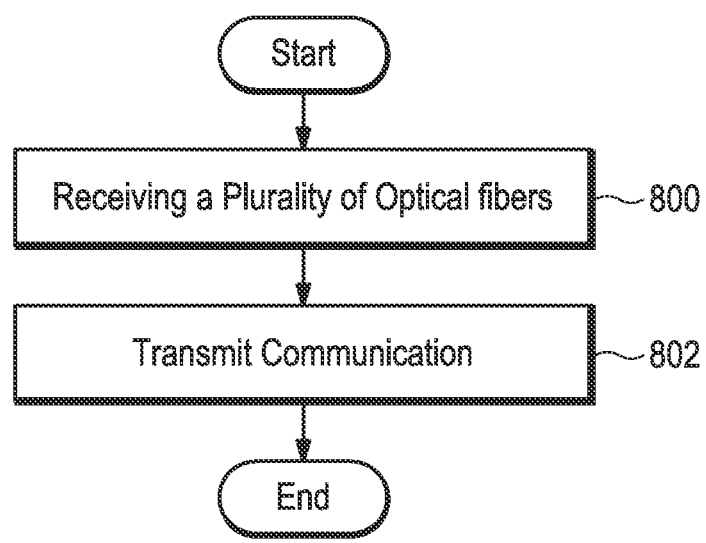
FIG. 8 illustrates a flow diagram in accordance with examples of the present disclosure.

FIG. 8 is a flow diagram according to some implementations. The processes of FIG. 8 are merely for illustrative purposes, and are not meant to imply various functions are order dependent. Other processes are contemplated.

The process of FIG. 8 provides (at 800) receiving by an intra-rack optical plenum a plurality of optical fibers. The plurality of optical fibers may be bundled, or in other examples, may be disposed within a removable tray configured to be inserted into the intra-rack optical plenum. The intra-rack optical plenum may interface with an inter-rack optical plenum via an extendable connector, for example, the extendable connector 710 of FIGS. 7A-B, via static connectors integrated with the intra-rack optical plenum, or through external cabling.

The process provides (at 802) transmitting via the plurality of optical fibers, communication from a first device coupled to the intra-rack optical plenum to a second device via optical fibers of the intra-rack optical plenum, wherein the second device is coupled to a second rack. In other words, an electronic device may route, via the plurality of optical fibers within both the intra-rack optical plenum and the inter-rack optical plenum, communication from a first device to a second device.

In various examples, receiving the optical fibers may comprise receiving a tray of optical fibers. The tray may include a lever or latching mechanism, which when actuated, secures the tray within the intra-rack optical plenum. The use of latching mechanisms in conjunction with both an intra-rack optical plenum and an inter-rack optical plenum enables fast deployment of rack-level and row-level preinstalled optical networks.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system, comprising:
 an inter-rack optical plenum to route a first optical fiber from a first rack to a second rack; and
 an intra-rack optical plenum to couple to the first rack, wherein the intra-rack optical plenum is to route a second optical fiber from a device connector to the inter-rack optical plenum to communicatively couple to the first optical fiber.

2. The system of claim 1, wherein the intra-rack optical plenum is configured to receive an optical tray comprising the second optical fiber; and
 wherein the intra-rack optical plenum is to align the tray with a connector of the inter-rack optical plenum.

3. The system of claim 2, wherein the tray comprises a lever configured to engage and release the tray with the intra-rack optical plenum.

4. The system of claim 2, wherein the inter-rack optical plenum includes a plurality of optical connectors to interface with additional trays of additional intra-rack optical plenums.

5. The system of claim 1, wherein the intra-rack optical plenum is configured to receive a bundle of optical fibers, and the inter-rack optical plenum is configured to receive another bundle of optical fibers.

6. The system of claim 1, wherein the inter-rack optical plenum is configured to extend to couple to an inter-rack optical plenum of the second rack.

7. The system of claim 1, wherein the intra-rack optical plenum includes an external connector configured to receive an external cable, the external cable to couple the second optical fiber to the first optical fiber.

8. The system of claim 1, further composing:
 a junction box coupled to the inter-rack optical plenum of the first rack, wherein the junction box is to interconnect the inter-rack optical plenum of the first rack and an inter-rack optical plenum of the second rack; and
 wherein the junction box comprises modular connectivity components.

9. A system, comprising:
 a first rack including an electronic device, wherein the electronic device of the first rack is coupled to an optical fiber routed through a first intra-rack optical plenum;
 a second rack including an electronic device, wherein the electronic device of the second rack is coupled to an optical fiber routed through a second intra-rack optical plenum; and
 an inter-rack optical plenum coupled to the first rack and the second rack, wherein the inter-rack optical plenum includes an optical fiber to communicatively couple the optical fiber routed through the intra-rack optical plenum to the optical fiber routed through the second intra-rack optical plenum.

10. The system of claim 9, wherein the opticala fiber routed through the first intra-rack optical plenum is disposed within an optical tray, and wherein the optical tray comprises a lever to secure the tray within the first intra-rack optical plenum.

11. The system of claim 9, wherein the optical fiber routed through the inter-rack optical plenum is disposed within an optical tray.

12. The system of claim 9, further comprising:
 a junction box coupled to the optical fiber routed through the first intra-rack optical plenum and the optical fiber routed through the second intra-rack optical plenum via the inter-rack optical plenum, wherein the junction box includes an external interface to the electronic device of the first rack and the electronic device of the second rack.

13. The system of claim 12, wherein the inter-rack optical plenum is integrated with the first rack and coupled to the second rack.

14. The system of claim 12, wherein the inter-rack optical plenum comprises an extensible bridge portion configured to couple to an additional inter-rack optical plenum.

15. A method, comprising:
receiving, by an intra-rack optical plenum of a first rack, a plurality of optical fibers wherein the intra-rack optical plenum aligns the plurality of optical fibers with an inter-rack optical plenum; and
transmitting, via the plurality of optical fibers, communication from a first device coupled to the intra-rack optical plenum to a second device via optical fibers of the inter-rack optical plenum, wherein the second device coupled to a second rack.

* * * * *